United States Patent Office 2,851,181
Patented Sept. 9, 1958

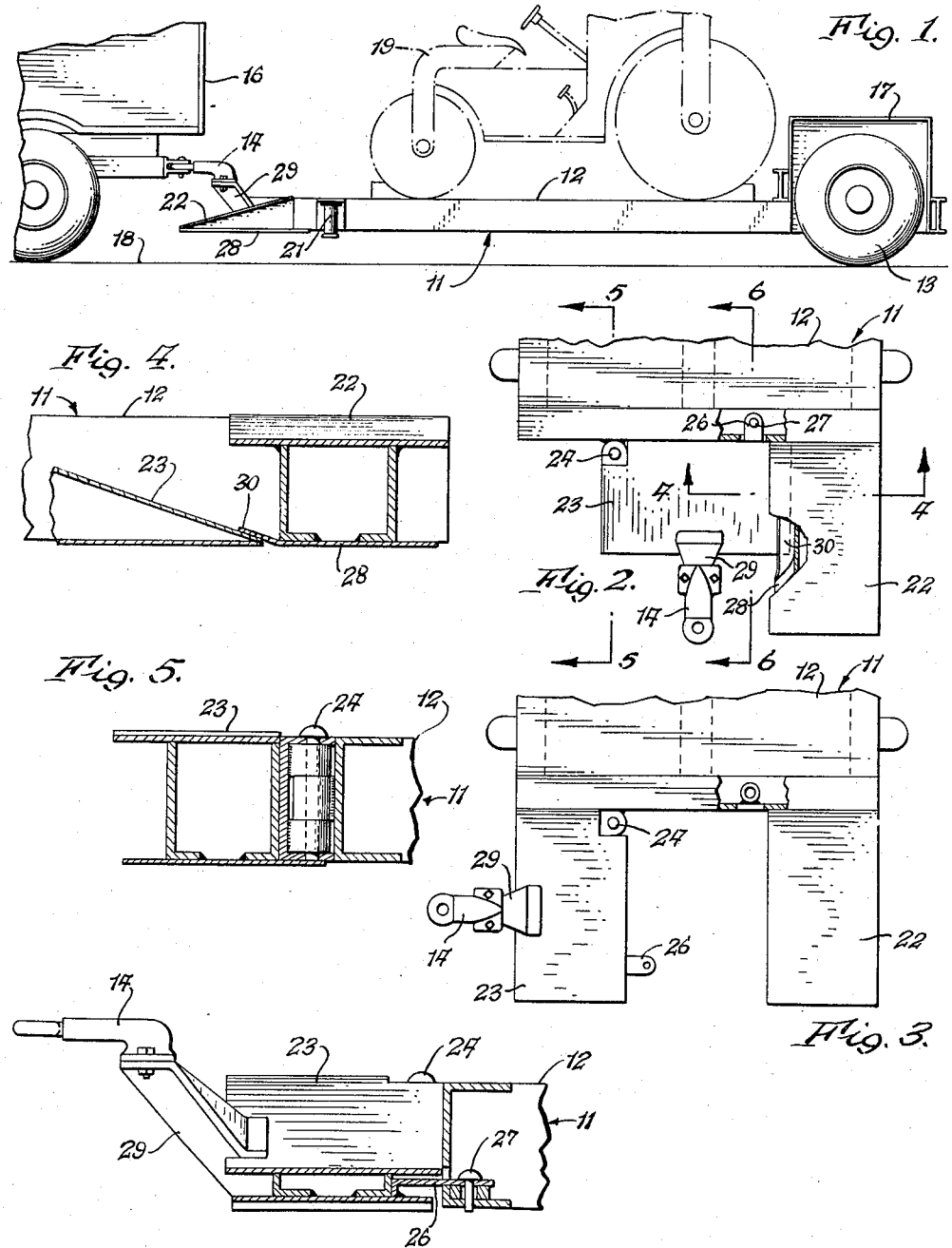

2,851,181

TRAILER FOR TRANSPORTING HEAVY DUTY EQUIPMENT

Bernard M. Thomann, Tonawanda, N. Y.

Application May 20, 1957, Serial No. 660,319

6 Claims. (Cl. 214—506)

This invention relates to trailers, and more particularly to trailers for transporting heavy duty equipment.

In transporting heavy duty equipment such as bulldozers and earth rollers, it is desirable to have the trailer as low as possible for easy loading and unloading. To achieve such an objective, serious problems are encountered in arranging a satisfactory connection for use with a standard tractor. The present invention, in addition to solving such problems, features a ramp arrangement which is combined with a towing connection to provide a heavy duty equipment transporting trailer of simplified design and convenient use.

The main object of this invention is to provide a heavy duty equipment transporting trailer which is built low for easy loading and unloading and which may be used with a standard tractor.

A further object is to provide a heavy duty equipment transporting trailer which features a combined ramp and towing connection of simplified design and convenient use.

These and further objects and features of the invention will become more apparent from the following description and accompanying drawing in which:

Fig. 1 is a view illustrating a trailer embodying the principles of the invention;

Fig. 2 is a fragmentary plan view of the forward end of the trailer of Fig. 1, in towing condition;

Fig. 3 is the same as Fig. 2, but in loading and unloading condition; and

Figs. 4, 5, and 6 are section views as seen from lines 4, 5, and 6 respectively in Fig. 2.

Referring now to the drawing, and more particularly to Fig. 1, the numeral 11 identifies a trailer embodying the principles of the invention, which trailer comprises a generally rectangular flat body portion, or platform 12, supported near the rear end by rubber-tired wheels 13, and at the front end by a towing means in the form of a goose-neck connection 14. The latter is shown attached to the rear of a truck 16, however, it will be appreciated that by a simple change in proportion if necessary, a goose-neck connection may be provided to fit any particular truck, or tractor, as the case may be. Wheel fenders 17, may be arranged to cover the wheels if desired. It will be observed that the trailer 11 is relatively low, or close to the road surface 18, to facilitate loading and unloading of the equipment being transported, such as an earth roller 19, illustrated in broken lines. A pair of jacks 21, which may be hydraulically operable by a hand pump (not shown), are arranged one on each side of the platform 12, for lowering and raising the front end of the platform during equipment loading or unloading.

As best seen in Figs. 2 to 6, a pair of sloping ramps 22, 23, are arranged at the front end of the platform 12, the ramp 22 being rigidly affixed to the platform, while the ramp 23 is pivoted to the platform by a hinge and pin connection 24. To provide high strength with relatively light weight, each ramp is preferably a welded sheet-steel structure, as illustrated. The ramp 23 has a tongue, or latch 26, which is arranged to project inwardly of the platform 12 and to be so maintained by a removable pin 27, to hold the ramp 23 folded against the platform (Fig. 2) during trailer movement. In such position of the ramp 23, it will be seen that the forward edge thereof will rest beneath a bottom sheet 28 of the ramp 22 on a bent portion 30 thereof, to thereby contribute to the rigidity and supporting strength of the ramp 23.

A bracket 29 affixed to the ramp 23, carries the goose-neck connection 14, and is arranged so that the center of the connection will coincide with the longitudinal center-line of the platform 12, when the ramp 23 is in folded position (Fig. 2). The bracket 29 and connection 14 will be maintained toward the side of the platform when the ramp 23 is rotated for trailer loading or unloading (Fig. 3), thus allowing unobstructed use of the ramp.

From an understanding of the foregoing description of the trailer, it will appear obvious that the invention provides a convenient arrangement for transporting or handling heavy duty equipment, and features means including a combined ramp and towing connection which allows a low trailer structure, and the possibility of use with various types of trucks, or tractors.

The foregoing description has been given in detail without thought of limitation since the inventive principles involved are capable of assuming other physical embodiments without departing from the spirit of the invention and the scope of the appended claims.

What is claimed is:

1. A trailer for transporting heavy duty equipment comprising a rectangular platform supported near the rear end by wheels, a pair of ramps arranged at the front end of the platform one of said ramps being pivotally affixed to the platform to rotate in the plane of the platform, means to fix the pivoted ramp against pivotal movement relative to the platform, and a towing means secured to the pivoted ramp adapted for connection to a towing vehicle.

2. A trailer for transporting heavy duty equipment comprising a rectangular platform supported near the rear end by wheels, a pair of ramps arranged at the front end of the platform one of said ramps being pivotally affixed to the platform to rotate in the plane of the platform, holding means adapted to hold the pivoted ramp against pivotal movement relative to the platform, and a goose-neck connection secured to the pivoted ramp and adapted for attachment to a towing vehicle.

3. A trailer for transporting heavy duty equipment comprising a rectangular platform supported near the rear end by wheels, a pair of ramps arranged at the front end of the platform one of said ramps being pivotally affixed to the platform to rotate in the plane of the platform, holding means adapted to hold the pivoted ramp against pivotal movement relative to the platform, and a goose-neck connection secured to one side of the pivoted ramp so that it is in alignment with the longitudinal center line of the platform when the pivoted ramp is held against pivotal movement by the holding means, said goose-neck connection adapted for attachment to a towing vehicle.

4. In a heavy duty equipment transporting trailer having a platform supported at the rear end by wheels, a ramp which is pivoted to the platform for rotation in the plane of the platform, means to fix the ramp against pivotal movement relative to the platform, and a towing connection affixed to said ramp.

5. In a heavy duty equipment transporting trailer having a rectangular platform supported at the rear end by wheels, a pair of sloped ramps arranged at the front end of the trailer, one of said ramps being permanently affixed to the platform with its sloping surface extending forwardly and downwardly relative to the platform, the other ramp being pivoted at a corner so that its sloped surface will extend forwardly and downwardly relative the platform when the ramp is in loading or unloading condition and so that its sloped surface will extend toward the longitudinal centerline of the platform when the trailer is in towing condition, a bracket affixed to the side of the pivoted ramp, and a goose-neck connection removably mounted on the top end of the bracket, said bracket and goose-neck connection being positioned so as to be in alignment with the longitudinal centerline of the platform when the trailer is in towing condition and holding means adapted to hold the pivoted ramp against pivotal movement relative to the platform when the trailer is in towing condition.

6. In a heavy duty equipment transporting trailer having a rectangular platform supported at the rear end by wheels, a pair of sloped ramps arranged at the front end of the trailer, one of said ramps being permanently affixed to the platform with its sloping surface extending forwardly and downwardly relative to the platform, the other ramp being pivoted at a corner so that its sloped surface will extend forwardly and downwardly relative the platform when the ramp is in loading or unloading condition and so that its sloped surface will extend toward the longitudinal centerline of the platform when the trailer is in towing condition, a bracket affixed to the side of the pivoted ramp, a goose-neck connection removably mounted on the top end of the bracket, said bracket and goose-neck connection being positioned so as to be in alignment with the longitudinal centerline of the platform when the trailer is in towing condition, and a tongue affixed to the pivoted ramp on the side opposite to that on which the bracket is mounted, said tongue adapted to receive a pin to maintain the ramp in fixed position when the trailer is in towing condition.

References Cited in the file of this patent
UNITED STATES PATENTS
2,774,497     Martin _____ Dec. 18, 1956